US011288938B2

(12) United States Patent
Ooki et al.

(10) Patent No.: US 11,288,938 B2
(45) Date of Patent: Mar. 29, 2022

(54) FUSION SPLICING DEVICE, THEFT SENSING SYSTEM OF FUSION SPLICING DEVICE, AND THEFT SENSING METHOD OF FUSION SPLICING DEVICE

(71) Applicant: SEI OPTIFRONTIER CO., LTD., Yokohama (JP)

(72) Inventors: Kazuyoshi Ooki, Yokohama (JP); Takahiro Suzuki, Yokohama (JP)

(73) Assignee: SEI OPTIFRONTIER CO., LTD., Yokohama (JP)

( * ) Notice: Subject to any disclaimer, the term of this patent is extended or adjusted under 35 U.S.C. 154(b) by 35 days.

(21) Appl. No.: 16/623,845

(22) PCT Filed: Jul. 5, 2018

(86) PCT No.: PCT/JP2018/025573
§ 371 (c)(1),
(2) Date: Dec. 18, 2019

(87) PCT Pub. No.: WO2019/009371
PCT Pub. Date: Jan. 10, 2019

(65) Prior Publication Data
US 2020/0134997 A1 Apr. 30, 2020

(30) Foreign Application Priority Data
Jul. 7, 2017 (JP) .............................. JP2017-133931

(51) Int. Cl.
*G08B 13/22* (2006.01)
*H04W 12/06* (2021.01)
(Continued)

(52) U.S. Cl.
CPC ........... *G08B 13/22* (2013.01); *G02B 6/2553* (2013.01); *G06F 21/88* (2013.01); *H04W 12/06* (2013.01);
(Continued)

(58) Field of Classification Search
CPC ...... G08B 13/22; G08B 13/1427; G08B 7/06; G02B 6/2553; G02B 6/2551; G06F 21/88;
(Continued)

(56) References Cited

U.S. PATENT DOCUMENTS

2005/0238298 A1  10/2005  Roark et al.
2007/0281666 A1  12/2007  Yoshida
(Continued)

FOREIGN PATENT DOCUMENTS

EP    1926335 B1    5/2011
EP    2 738 583 A1  6/2014
(Continued)

OTHER PUBLICATIONS

Aug. 28, 2018 International Search Report issued in International Patent Application No. PCT/JP2018/025573.

*Primary Examiner* — Adnan Aziz
(74) *Attorney, Agent, or Firm* — Oliff PLC

(57) ABSTRACT

A fusion splicer is capable of sensing whether or not the fusion splicer is in a stolen state in cooperation with a theft sensing device. The fusion splicer includes an authentication processing unit that authenticates the theft sensing device, a storage unit that stores identification information of the theft sensing device subjected to authentication processing, a decision unit that decides whether or not the fusion splicer is in a stolen state based on a communication condition with respect to the theft sensing device, a locking unit that locks at least a part of functions of the fusion splicer when it is decided that the fusion splicer is in a stolen state, a releasing unit that temporarily releases the locked function of the fusion splicer, and an input unit that receives an input of a release ID for releasing the locked state.

18 Claims, 12 Drawing Sheets

(51) Int. Cl.
  *H04W 24/08* (2009.01)
  *G02B 6/255* (2006.01)
  *G06F 21/88* (2013.01)
  *G08B 7/06* (2006.01)
  *G08B 13/14* (2006.01)

(52) U.S. Cl.
  CPC ..... *H04W 24/08* (2013.01); *G06F 2221/2111* (2013.01); *G08B 7/06* (2013.01); *G08B 13/1427* (2013.01)

(58) Field of Classification Search
  CPC .... G06F 2221/2111; G06F 2221/2143; H04W 12/06; H04W 24/08
  See application file for complete search history.

(56) References Cited

U.S. PATENT DOCUMENTS

| | | | |
|---|---|---|---|
| 2008/0122595 A1* | 5/2008 | Yamamichi | B60R 25/24 340/426.16 |
| 2010/0197271 A1* | 8/2010 | Yoshikawa | H04L 63/0492 455/411 |
| 2013/0284377 A1 | 10/2013 | Takayanagi et al. | |
| 2013/0335193 A1 | 12/2013 | Hanson et al. | |
| 2013/0336621 A1* | 12/2013 | Zaxquarim | G02B 6/46 385/96 |
| 2014/0165657 A1* | 6/2014 | Sato | G02B 6/2555 65/485 |
| 2015/0022350 A1* | 1/2015 | Hsu | G08B 21/24 340/539.32 |
| 2016/0005284 A1 | 1/2016 | Batra et al. | |
| 2016/0143407 A1* | 5/2016 | Lim | G07C 9/00896 190/101 |
| 2016/0353279 A1* | 12/2016 | Sugaya | H04W 4/02 |
| 2017/0013464 A1* | 1/2017 | Fish | H04W 12/08 |
| 2017/0171204 A1 | 6/2017 | Forood et al. | |
| 2017/0213433 A1* | 7/2017 | Qin | G08B 29/188 |
| 2017/0325065 A1* | 11/2017 | Azam | H04W 4/20 |
| 2019/0102347 A1* | 4/2019 | Tanabe | G06F 16/953 |

FOREIGN PATENT DOCUMENTS

| | | |
|---|---|---|
| JP | 2006-155061 A | 6/2006 |
| JP | 2007-122558 A | 5/2007 |
| JP | 2007-150668 A | 6/2007 |
| JP | 2007-323580 A | 12/2007 |
| JP | 2009-054012 A | 3/2009 |
| JP | 2009-530968 A | 8/2009 |
| JP | 2012-141357 A | 7/2012 |
| JP | 2017-058863 A | 3/2017 |
| WO | 2007/026745 A1 | 3/2007 |
| WO | 2007/111652 A1 | 10/2007 |
| WO | 2012/090335 A1 | 7/2012 |
| WO | 2016/080986 A1 | 5/2016 |

* cited by examiner

Fig.6

| RADIOWAVE INTENSITY | RESPONSE TIME | DISTANCE BETWEEN FUSION SPLICER AND INFORMATION TERMINAL |
|---|---|---|
| -40dBm | 0.01ms | 1m |
| -50dBm | 0.05ms | 8m |
| -60dBm | 0.20ms | 17m |
| -70dBm | 1.00sec | 20m |
| -80dBm | 2.00sec | 30m |
| -90dBm | 4.00sec | 35m |

FUSION SPLICING DEVICE, THEFT SENSING SYSTEM OF FUSION SPLICING DEVICE, AND THEFT SENSING METHOD OF FUSION SPLICING DEVICE

TECHNICAL FIELD

The present invention relates to a fusion splicer, a theft sensing system of the fusion splicer, and a theft sensing method for the fusion splicer. This application claims priority based on Japanese Patent Application No. 2017-133931, filed Jul. 7, 2017, the entire content disclosed in the application is incorporated herein by reference.

BACKGROUND ART

Patent Literature 1 discloses a fusion splicer that splices optical fibers to each other.

CITATION LIST

Patent Literature

[Patent Literature 1] Japanese Unexamined Patent Publication No. JP2012-141357

SUMMARY OF INVENTION

The present disclosure discloses a fusion splicer capable of sensing whether or not the fusion splicer is in a stolen state in cooperation with an external theft sensing device. This fusion splicer includes an authentication processing unit that authenticates the theft sensing device to connect the fusion splicer and the theft sensing device to each other through a predetermined communication technique, a storage unit that stores identification information of the theft sensing device subjected to authentication processing by the authentication processing unit, a decision unit that decides whether or not the fusion splicer is in a stolen state based on communication conditions of the predetermined communication technique with respect to the theft sensing device, a locking unit that locks at least a part of functions of the fusion splicer when the decision unit decides that the fusion splicer is in a stolen state, a releasing unit that temporarily releases the function of the fusion splicer locked by the locking unit, and an input unit that receives an input of a release ID for unlocking by the releasing unit. The releasing unit temporarily releases the locked state when the release ID input from the input unit corresponds to the identification information stored in the storage unit.

BRIEF DESCRIPTION OF DRAWINGS

FIG. 6 is a view illustrating an example of a distance database included in the theft sensing system illustrated in FIG. 3.

DESCRIPTION OF EMBODIMENT

Figure 1:
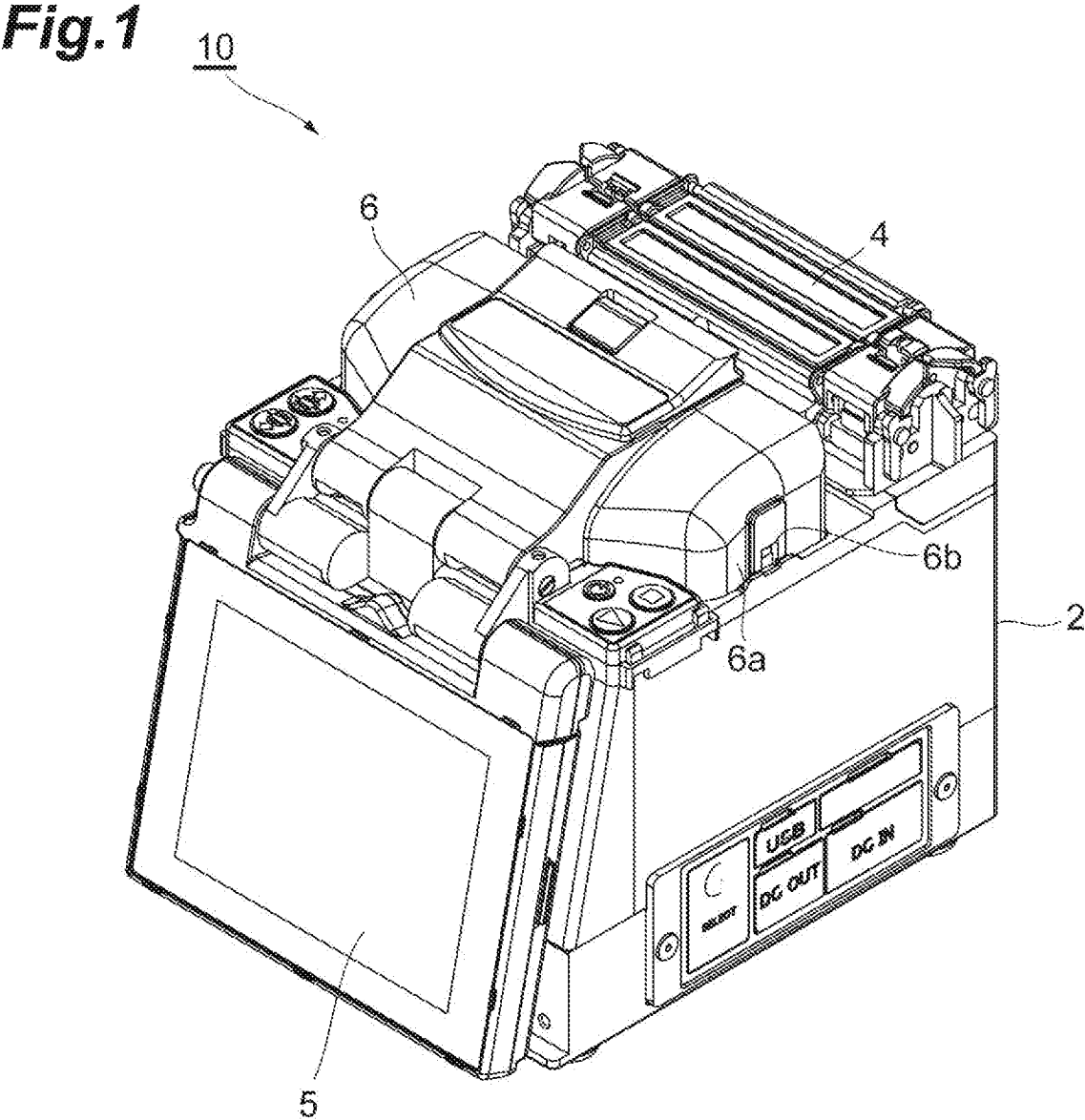
FIG. 1 is a perspective view illustrating an example of a fusion splicer.

Problem to be Solved by Present Disclosure

Fusion splicers as described above are used at a site where optical fibers are being laid. At a laying site, a user of a fusion splicer also performs work other than fusion work of optical fibers. Thus, the user may be absent from the fusion splicer, and the fusion splicer may be stolen at this time. In preparation for such theft, it is conceivable that a security function such as a password-based lock mechanism be provided in a fusion splicer. However, with a security function such as a password, it is difficult to prevent theft of a fusion splicer itself. In addition, there is also a possibility that the fusion splicer will be resold if the password is cracked. Therefore further improvement is desired from a viewpoint of the theft prevention.

Theft sensing systems capable of preventing theft of a fusion splicer have been examined. In such theft sensing systems, it is conceivable that when theft of the fusion splicer is sensed, occurrence of theft be immediately notified to a user and functions of the fusion splicer be locked and disabled, so that a sufficient preventing theft effect can be expected therewith. On the other hand, it is also conceivable that the device be misidentified as being in a stolen state due to malfunction in a part of the device although it has not actually been stolen, so that the fusion splicer is locked and disabled. Such a locked state can be devised to be able to be released using a master key or the like built into the fusion splicer in advance. However, even in such a case, there is a need to provide a requirement of a predetermined procedure, such as a user calling a support center to verify himself/herself due to a demand for the security, and there is concern regarding the time taken until the device is unlocked. Thus, for example, it may take one to several days to unlock the device, so that work using the fusion splicer has to be interrupted during this period, and thus improvement thereof is desired.

Advantageous Effects of Present Disclosure

According to the present disclosure, theft of a fusion splicer can be prevented, and work can be continuously performed even when a device is misidentified as being stolen and locked due to malfunction or the like.

Description of Embodiments of the Invention of this Application

First, embodiments of the invention of this application is enumerated and described. A theft sensing system according to an aspect of the present invention is a fusion splicer capable of sensing whether or not a the fusion splicer is in a stolen state in cooperation with an external theft sensing device. This fusion splicer includes an authentication processing unit that authenticates the theft sensing device to connect the fusion splicer and the theft sensing device to each other through a predetermined communication technique, a storage unit that stores identification information of the theft sensing device subjected to authentication processing by the authentication processing unit, a decision unit that decides whether or not the fusion splicer is in a stolen state based on a communication condition of the predetermined communication technique with respect to the theft sensing device, a locking unit that locks at least a part of functions of the fusion splicer when the decision unit decides that the fusion splicer is in a stolen state, a releasing unit that temporarily releases the function of the fusion splicer locked by the locking unit, and an input unit that receives an input of a release ID for unlocking by the releasing unit. The releasing unit temporarily releases the locked state when the release ID input from the input unit corresponds to the identification information stored in the storage unit.

In this fusion splicer, the decision unit decides whether or not the fusion splicer is in a stolen state based on the communication condition with respect to the theft sensing device, and the locking unit locks at least a part of the functions of the fusion splicer when it is decided to be in a stolen state. In addition, the storage unit stores the identification information of the theft sensing device subjected to authentication processing, and the releasing unit temporarily releases the locked state described above when the release ID input from the input unit corresponds to this identification information. Thus, according to this fusion splicer, theft of the fusion splicer can be prevented due to deciding by the decision unit and locking of the functions by the locking unit, and a temporary release of the function locked in response to sensing of theft can be realized easily by the releasing unit. As a result, even when the communication condition deteriorates due to malfunction of the theft sensing device, a problem of communication (wireless or the like) with respect to the theft sensing device, or the like, so that it is erroneously decided that the fusion splicer is in a stolen state and the device functions are locked, the locked state can be released using the identification information. Thus, interruption of work due to the fusion splicer can be avoided and the work can be continuously performed. Since the unlocking described above is temporarily performed, an influence on the function inhibiting theft of the fusion splicer can be reduced.

In this fusion splicer, the decision unit may decide that the fusion splicer is in a stolen state when wireless communication from the theft sensing device through the predetermined communication technique is not able to be received for a predetermined time period. When the theft sensing device or a communication unit of the fusion splicer has malfunctioned or the like, wireless communication between the theft sensing device and the fusion splicer is completely lost. Thus, when the decision unit cannot receive wireless communication from the theft sensing device for a predetermined time period, the condition of the malfunction can be sensed more reliably by deciding that the fusion splicer is in a stolen state.

In this fusion splicer, the storage unit may execute processing of deleting or disabling the stored identification information of the theft sensing device after elapse of a predetermined time period. The locked functions of the fusion splicer can be temporarily released more reliably by executing such processing, and theft of the fusion splicer can be prevented more reliably.

In this fusion splicer, the locking unit may lock the function of the fusion splicer again after the locked state is temporarily released by the releasing unit. Consequently, theft of the fusion splicer can be prevented more reliably.

In this fusion splicer, the identification information of the theft sensing device may be acquired during authentication of the theft sensing device by the authentication processing unit, and the identification information thereof may be stored in the storage unit. In this case, the identification information of the theft sensing device can be acquired more reliably.

A theft sensing system according to another aspect of the present invention is a theft sensing system for sensing a stolen state of a fusion splicer using a theft sensing device. This theft sensing system includes an authentication processing unit that authenticates the fusion splicer to connect the fusion splicer and the theft sensing device to each other through a predetermined communication technique, an acquisition unit that acquires wireless condition data regarding wireless connection with respect to the fusion splicer by the authentication processing unit, a decision unit that decides whether or not the fusion splicer is in a stolen state based on a change in the wireless condition data acquired by the acquisition unit, and a notification unit that issues a notification when the decision unit decides that the fusion splicer is in a stolen state. In this theft sensing system, all of the authentication processing unit, the acquisition unit, the decision unit, and the notification unit described above may be provided in the theft sensing device, or a part thereof may be provided in a device (central management server or the like) other than the theft sensing device in the theft sensing system. In addition, the theft sensing device may be a dedicated device for sensing theft or may be a general-purpose information terminal (for example, a smartphone) or the like. In this case, the functions described above can be realized by installing a program which is executed by a computer system such as an information terminal.

This theft sensing system may further include a distance table that stores relationship data of at least one of a radiowave intensity and a response time between the fusion splicer and the theft sensing device and a distance between the fusion splicer and the theft sensing device. In this case, the decision unit may calculate the distance between the fusion splicer and the theft sensing device based on at least one of the radiowave intensity and the response time stored in the distance table and may decide whether or not the fusion splicer is in a stolen state based on a change in the distance.

In this theft sensing system, the acquisition unit may acquire data which is the wireless condition data of at least one of the radiowave intensity and the response time between the fusion splicer and the theft sensing device in a predetermined cycle. In this case, the decision unit may calculate the distance between the fusion splicer and the theft sensing device every time the wireless condition data is acquired and may decide that the fusion splicer is in a stolen state when a state where the distance becomes longer than a distance acquired prior thereto continues.

This theft sensing system may further include a releasing unit to temporarily release a locked state when it is decided that the fusion splicer is in a stolen state and a fusion mechanism of the fusion splicer is locked. In addition, the theft sensing system may further include a position acquisition unit that acquires positional information of the fusion splicer when it is decided that the fusion splicer is in a stolen state.

A theft sensing method according to another aspect of the present invention is a method for sensing theft of a fusion splicer using a theft sensing device. This theft sensing method includes a step of performing mutual authentication between the fusion splicer and the theft sensing device such that the fusion splicer and the theft sensing device are wirelessly connected to each other, a step of acquiring a reference value of wireless condition data between the fusion splicer and the theft sensing device which are wirelessly connected to each other, a step of acquiring the wireless condition data between the fusion splicer and the theft sensing device which are wirelessly connected to each other in a predetermined cycle after the reference value of the wireless condition data is acquired, and a step of deciding whether or not the fusion splicer is stolen based on the wireless condition data acquired in the predetermined cycle. In this theft sensing method, each of the steps described above may be executed by any of the theft sensing device and the fusion splicer. A part of the steps may be performed by a device (for example, a central management server or the like in a theft sensing system) other than the theft sensing device and the fusion splicer.

In this theft sensing method, in the step of deciding theft, a distance between the fusion splicer and the theft sensing device may be calculated based on at least one of a radiowave intensity and a response time stored in a distance table with reference to the distance table storing relationship data of at least one of the radiowave intensity and the response time between the fusion splicer and the theft sensing device and the distance between the fusion splicer and the theft sensing device. Then, it may be decided whether or not the fusion splicer is in a stolen state based on a change in the distance.

In this theft sensing method, in the step of acquiring the wireless condition data in the predetermined cycle, data which is the wireless condition data of at least one of the radiowave intensity and the response time between the fusion splicer and the theft sensing device may be acquired in the predetermined cycle. In addition, in the step of deciding theft, the distance between the fusion splicer and the theft sensing device may be calculated every time the wireless condition data is acquired, and it may be decided that the fusion splicer is in a stolen state when a state where the distance becomes longer than a distance acquired prior thereto continues.

In this theft sensing method, in step of acquiring the reference value of the wireless condition data, at least one of the radiowave intensity and the response time between the fusion splicer and the theft sensing device may be acquired. In addition, this theft sensing method may further include a step of acquiring positional information of the fusion splicer when it is determined that the fusion splicer is in a stolen state.

Details of Embodiment of Present Invention

A fusion splicer according to an embodiment of the present invention will be described below with reference to the drawings. The present invention is not limited to the examples. The present invention is indicated by the claims, and it is intended to include all the changes within meanings and a range equivalent to the claims.

Figure 2:
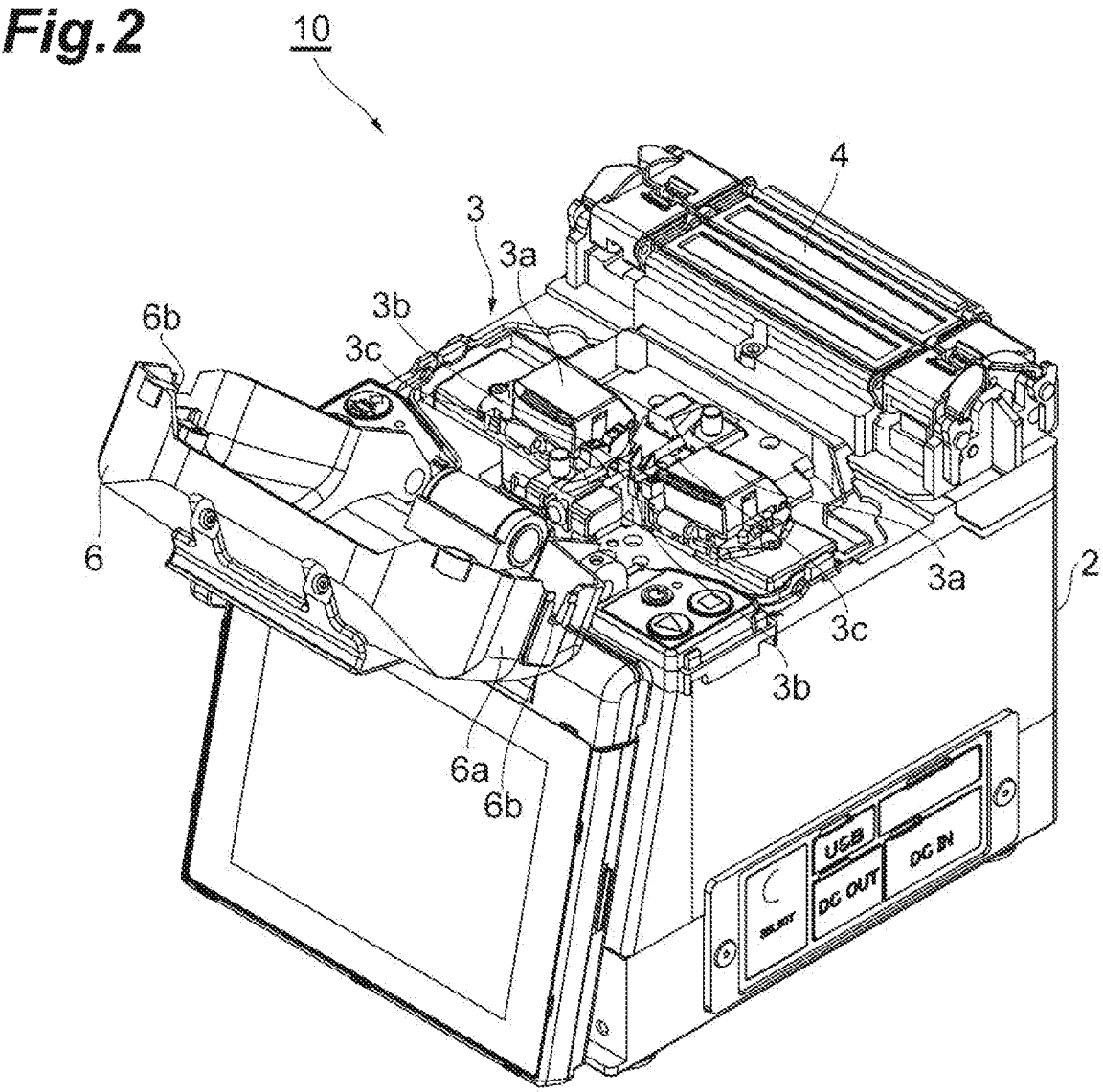
FIG. 2 is a perspective view illustrating a fusion splicing portion (internal structure) of optical fibers in the fusion splicer illustrated in FIG. 1.

A fusion splicer 10 having a function of sensing theft will be described with reference to FIGS. 1 and 2. FIGS. 1 and 2 are perspective views illustrating the external appearance of the fusion splicer. FIG. 1 illustrates the external appearance of the fusion splicer in a state where a windshield cover is closed, and FIG. 2 illustrates the external appearance in a state where the windshield cover is open such that an internal structure of the fusion splicer can be seen. The fusion splicer 10 is a device for performing fusion splicing of optical fibers to each other and includes a box-shaped casing 2, as illustrated in FIGS. 1 and 2. In an upper portion of the casing 2, a fusion device 3 for performing fusion between optical fibers, and a heater 4 heating and contracting a fiber reinforcing sleeve covered with a fusion splicing portion of the optical fibers fused by the fusion device 3 are provided. The fusion splicer 10 includes a monitor 5 displaying an image of fusion splicing conditions between optical fibers captured by a camera (not illustrated) disposed inside the casing 2. Moreover, the fusion splicer 10 includes a windshield cover 6 for preventing wind from entering the fusion device 3.

The fusion device 3 has a holder mounting unit capable of mounting a pair of optical fiber holders 3a, a pair of fiber positioning units 3b, and a pair of discharging electrodes 3c. Optical fibers (fusion targets) are respectively held and fixed by the optical fiber holders 3a, and each of the optical fiber holder is mounted and fixed to the holder mounting unit. The fiber positioning units 3b are disposed between the optical fiber holders 3a for positioning of tip portions of optical fibers respectively held by the optical fiber holders 3a. The discharging electrodes 3c are electrodes disposed between the fiber positioning units 3b for fusion between tips of optical fibers through arc discharging.

The windshield cover 6 is joined to the casing 2 such that the fusion device 3 is covered in a manner of being able to be opened and closed freely. An introduction port 6b for introducing an optical fiber to the fusion device 3 (that is, to each of the optical fiber holders 3a) is formed on each side surface 6a of the windshield cover 6.

Figure 3:
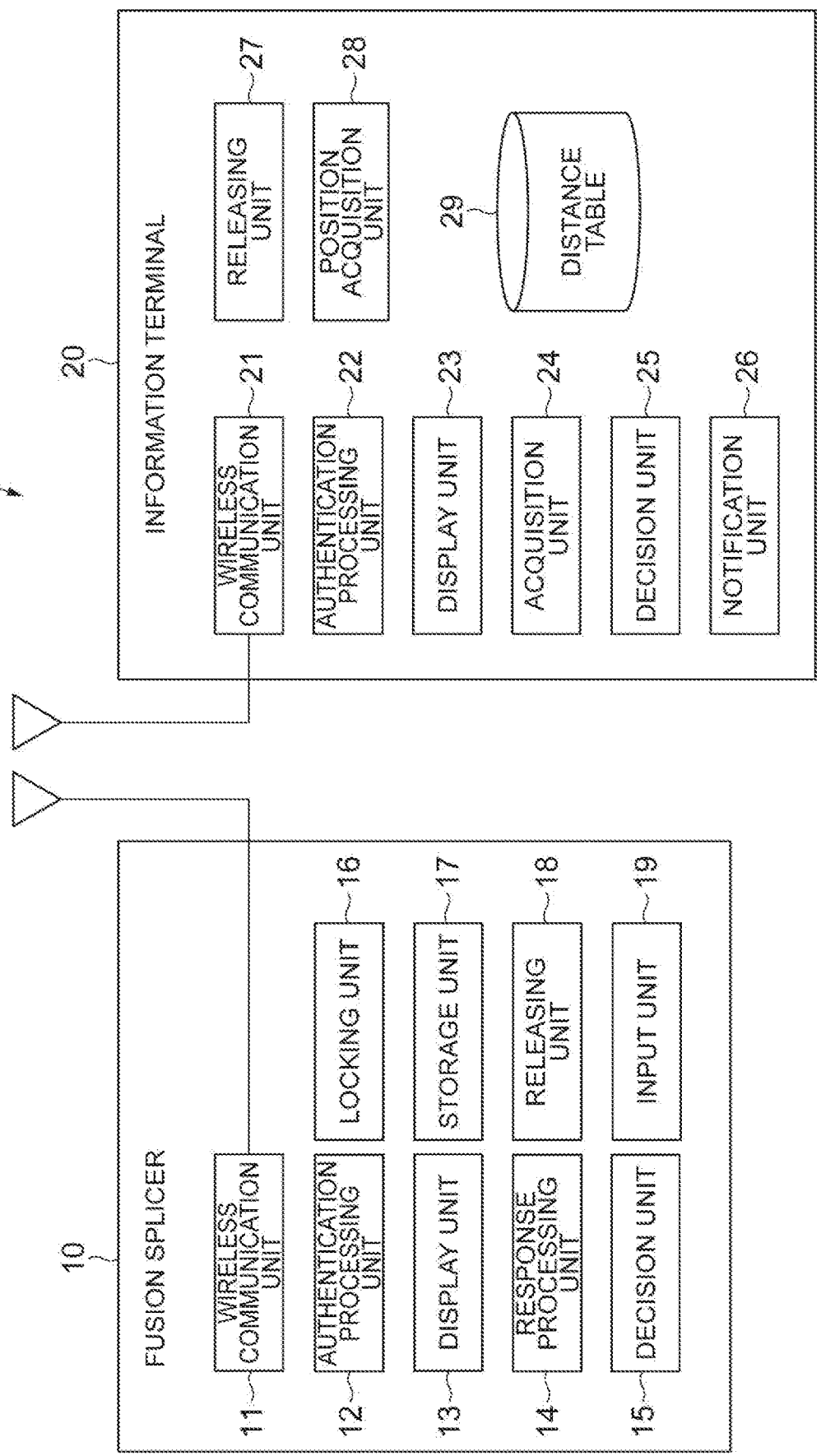
FIG. 3 is a block diagram showing an overview of a theft sensing system of the fusion splicer according to an aspect of the present invention.

Next, a constitution of a theft sensing system 1 for sensing a stolen state of the fusion splicer 10 will be described with reference to FIG. 3. FIG. 3 is a block diagram showing an overview of a theft sensing system of the fusion splicer. As illustrated in FIG. 3, the theft sensing system 1 includes the fusion splicer 10 and an information terminal 20 which can be wirelessly connected to each other. The theft sensing system 1 has a function of deciding whether or not the fusion splicer 10 is in a stolen state in accordance with a condition of wireless communication between the two, and issuing a notification to a user or locking (disabling) the functions of the fusion splicer 10 when it is decided to be in a stolen state. FIG. 3 illustrates an example in which one fusion splicer 10 is wirelessly connected to one information terminal 20. A constitution in which a plurality of fusion splicers 10 are wirelessly connected to one information terminal 20 may be adopted. A constitution in which one or a plurality of fusion splicers 10 are wirelessly connected to a plurality of information terminals 20 may be adopted.

Figure 5:
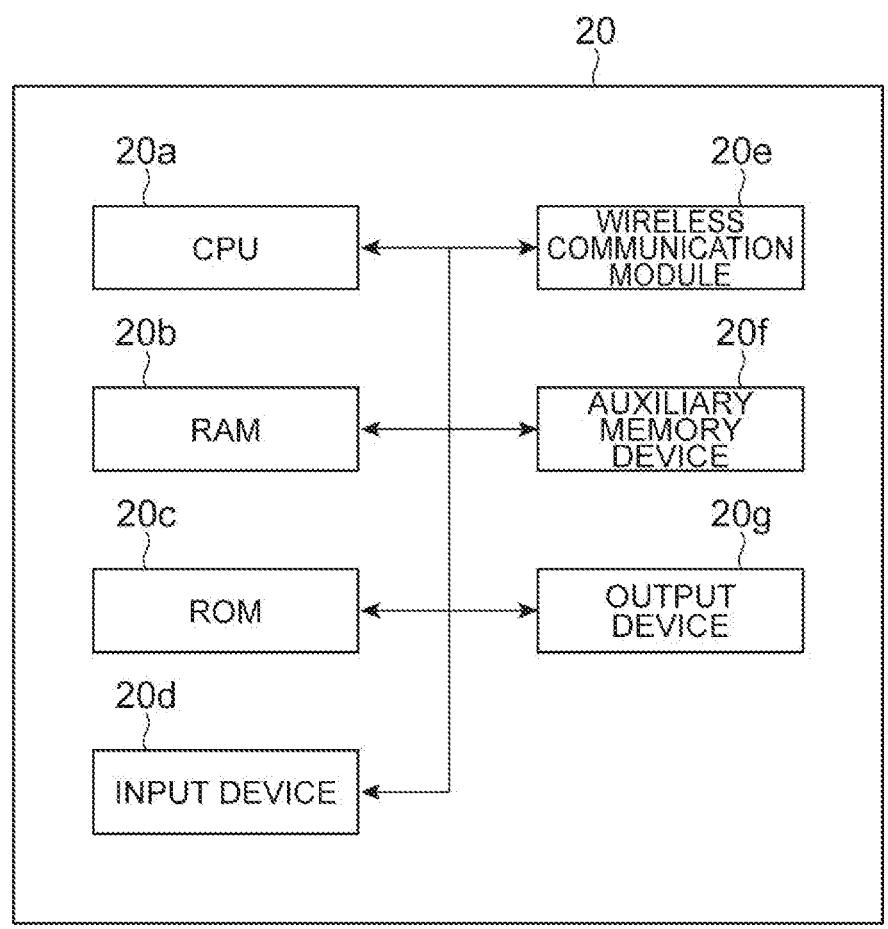
FIG. 5 is a block diagram showing a hardware constitution of an information terminal illustrated in FIG. 3.

A constitution of the information terminal 20 which functions as a theft sensing device will be described. For example, the information terminal 20 is constituted of a portable wireless communication terminal such as a smartphone and includes a wireless communication unit 21, an authentication processing unit 22, a display unit 23, an acquisition unit 24, a decision unit 25, a notification unit 26, a releasing unit 27, a position acquisition unit 28, and a distance table 29. As illustrated in FIG. 5, the information terminal 20 is constituted to include a computer having hardware such as a CPU 20a, a RAM 20b, a ROM 20c, an input device 20d, a wireless communication module 20e, an auxiliary memory device 20f, and an output device 20g. When these constituent elements are operated by a program or the like, each of the functions (which will be described below) of the information terminal 20 is achieved. Regarding these functions, each of the functions can be implemented in the information terminal 20 by installing a predetermined program in the information terminal 20 from a central management server or the like of the theft sensing system 1 through a cable or wireless communication. Each of the functions of the fusion splicer 10 may be implemented through similar installation.

The wireless communication unit 21 is constituted of the wireless communication module 20e, and transmits and receives various kinds of message signals through wireless communication with respect to a wireless communication unit 11 of the fusion splicer 10. For example, the wireless communication unit 21 is constituted of a wireless LAN module built into a terminal and performs communication, for example, at a band of 2.4 GHz conforming to IEEE 802.11 such that it corresponds to the wireless communication standards of the wireless communication unit 11. As long as wireless communication can be performed with respect to the wireless communication unit 11, other bands or other communication standards may be adopted.

The authentication processing unit 22 performs authentication procedure such as pairing processing with respect to the fusion splicer 10 (authentication processing unit 12). The authentication processing unit 22 causes the display unit 23 (which will be described below) to display a four-digit number which is pairing information for performing pairing processing with respect to the fusion splicer 10, and transmits a message signal including the four-digit number to the fusion splicer 10 (authentication processing unit 12) via the wireless communication unit 21. When a message signal including information indicating "perform pairing" is received from the fusion splicer 10 (authentication processing unit 12), the authentication processing unit 22 completes pairing processing with respect to the fusion splicer 10. When information indicating "perform pairing" is received from the fusion splicer 10, the authentication processing unit 22 may transmit the information to the management server (not illustrated) collectively controlling a system including the theft sensing system. During the pairing processing described above, the authentication processing unit 22 transmits an identification ID (for example, a phone number, a mail address, or the like of the information terminal 20) identifying the individual information terminal 20 to the fusion splicer 10 via the wireless communication units 21 and 11.

The display unit 23 is a part displaying various kinds of information in the information terminal 20. The display unit 23 displays a four-digit number generated by the authentication processing unit 22 for pairing in a display of the information terminal 20 for a predetermined time (for example, 10 seconds as a pairing standby time). The display unit 23 displays an interval (for example, every minute, every ten minutes, every hour, or every day) for sensing the presence or absence of theft and/or a total time (for ten minutes, for an hour, for a day, for thirty days, or the like) of sensing the presence or absence of theft in the theft sensing system 1 in the display as a selection screen. The display unit 23 delivers a desired interval and/or a desired total time selected by a worker to the acquisition unit 24.

The acquisition unit 24 acquires wireless condition data between the fusion splicer 10 and the information terminal 20 which are wirelessly connected to each other through authentication processing. For example, the acquisition unit 24 acquires a wireless radiowave intensity and/or a response time of communication between the fusion splicer 10 and the information terminal 20 as the wireless condition data at a predetermined cycle (sensing interval described above). The acquisition unit 24 may acquire only the wireless radiowave intensity between the fusion splicer 10 and the information terminal 20, may acquire only the response time of communication between the fusion splicer 10 and the information terminal 20, or may acquire both the wireless radiowave intensity and the response time, as the wireless condition data. The wireless condition data acquired by the acquisition unit 24 is not limited to those described above, and other kinds of information may be acquired and used as long as the information is wireless communication related information corresponding to a change in distance between the fusion splicer 10 and the information terminal 20.

The decision unit 25 decides whether or not the fusion splicer 10 has moved in a direction away from the information terminal 20 based on a change in the wireless condition data acquired by the acquisition unit 24. Specifically, the decision unit 25 checks the distance table 29 (refer to FIG. 6) for the wireless condition data (radiowave intensity and/or response time) acquired by the acquisition unit 24 and calculates the distance between the fusion splicer 10 and the information terminal 20. As illustrated in FIG. 6, a relationship between the wireless condition data (radiowave intensity and response time) between the fusion splicer 10 and the information terminal 20 and the distance between the fusion splicer 10 and the information terminal 20 is set in advance in the distance table 29, for example. Distance information or the like listed in the distance table 29 may be set to include a predetermined relational expression in advance such that fine adjustment may be performed in accordance with a radiowave intensity or a response time obtained at a site.

Figure 7:
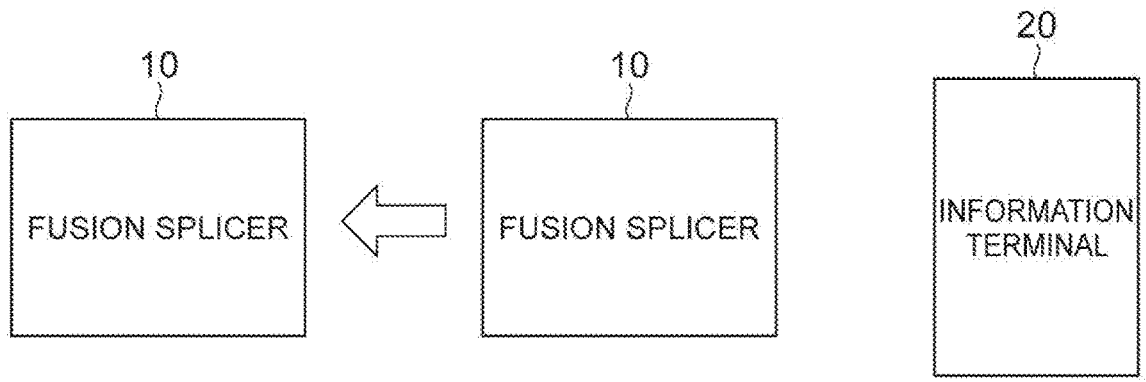
FIG. 7 is a view schematically illustrating movement (stolen state) of the fusion splicer sensed by the theft sensing system illustrated in FIG. 3.

When the distance calculated by checking the distance table 29 is larger than a distance calculated prior thereto (when there is a change), the decision unit 25 decides that the fusion splicer 10 has moved in a direction away from the information terminal 20 (refer to FIG. 7). When deciding that the calculated distance is larger than the distance calculated prior thereto continues a predetermined number of times (for example, three times) in this deciding step, the decision unit 25 may decide that the fusion splicer 10 has moved in a direction away from the information terminal 20. In this case, it is possible to more reliably exclude erroneous detection of movement of the fusion splicer 10 which has not been stolen, as a stolen state.

The notification unit 26 is a part performing predetermined notification processing in the information terminal 20 and informing a worker of the result when the decision unit 25 decides that the fusion splicer 10 has moved in a direction away from the information terminal 20. When such a stolen state is sensed, the notification unit 26 notifies a user of the result using a notification means such as a sound (buzzer), displaying a screen message, or applying vibration. Consequently, a user holding the information terminal 20 can sense the theft condition of the fusion splicer 10.

The releasing unit 27 is a part for releasing a locked state from the information terminal 20 when it is decided that the fusion splicer 10 is in a stolen state and a fusion mechanism is locked. When an instruction of releasing the locked state of the fusion splicer 10 locked due to a predetermined condition is received through input processing from a user, the releasing unit 27 generates a release signal including the pairing information retained by the authentication processing unit 22 and transmits the release signal to the fusion splicer 10 via the wireless communication unit 21. When a release signal is received on the fusion splicer 10, the pairing information included in the release signal is checked for. When the release signal matches the pairing information held on the fusion splicer 10, the locking processing is released by a locking unit 16. Consequently, the locked state of the fusion splicer 10 can be released from the information terminal 20. The function of the releasing unit 27 described above may be provided in a server of an integrated system including the theft sensing system 1. In this case as well, the server can perform unlocking processing by transmitting a signal for releasing a locked state by the locking unit 16 to the fusion splicer 10 via any wireless communication means using the pairing information which is authentication information acquired in advance, similar to that described above. In place of the pairing information described above or together with the pairing information, the releasing unit 27 may use the identification ID of the information terminal 20 as a release signal.

When the decision unit 25 decides that the fusion splicer 10 has moved in a direction away from the information terminal 20, or when the decision unit 25 decides that wireless communication between the fusion splicer 10 and the information terminal 20 is disconnected, the position acquisition unit 28 decides that the fusion splicer 10 has been stolen and acquires positional information of the fusion splicer 10. If the fusion splicer 10 has been stolen, an application for a theft report or a theft insurance will be made. At this time, there is a need to indicate the location of theft. Here, if the information terminal 20 has acquired approximate information of such a theft position, the positional information can be verified easily at the time of the application. For example, the position acquisition unit 28 is constituted to include a GPS or the like and acquires positional information using the GPS or the like. The position acquisition unit 28 may be constituted to acquire positional information of the fusion splicer 10 at all times or regularly and may acquire the positional information as particular positional information when it is decided as described above.

Figure 4:
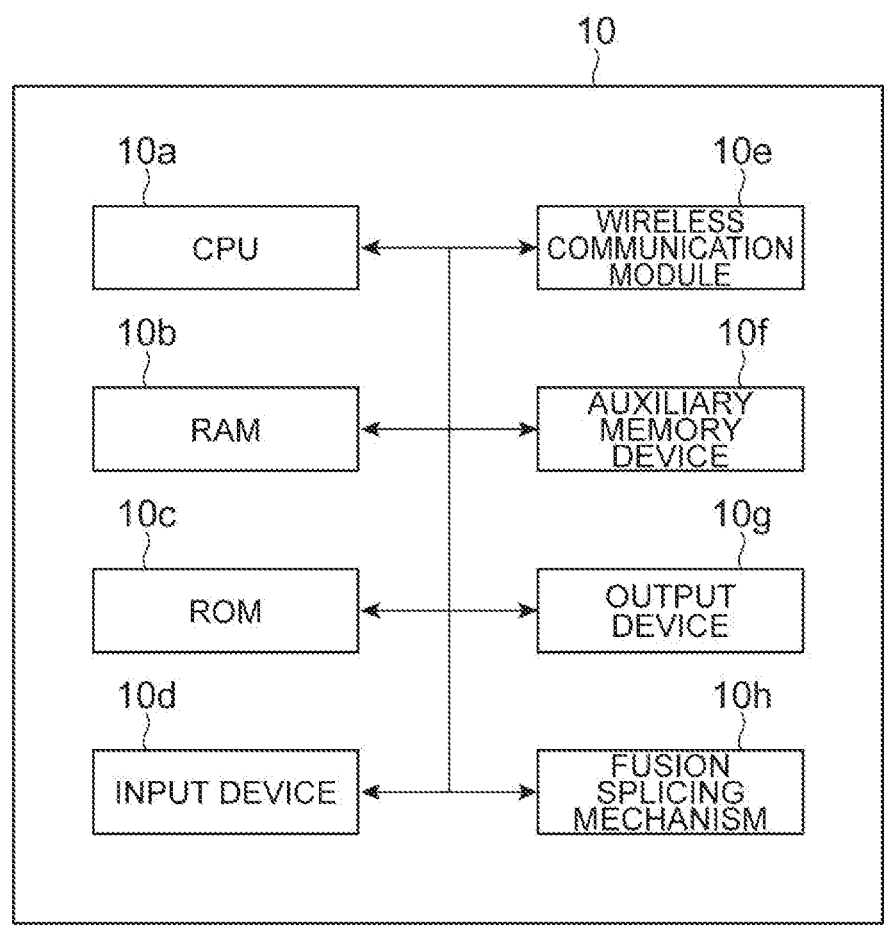
FIG. 4 is a block diagram showing a hardware constitution of the fusion splicer illustrated in FIG. 3.

Next, the fusion splicer 10 capable of sensing whether or not the fusion splicer 10 is in a stolen state in cooperation with the information terminal 20 which is a theft sensing device described above will be described. As illustrated in FIG. 3, the fusion splicer 10 functionally includes the wireless communication unit 11, the authentication processing unit 12, a display unit 13, a response processing unit 14, a decision unit 15, the locking unit 16, a storage unit 17, a releasing unit 18, and an input unit 19. The fusion splicer 10 further includes a power source unit (battery) for driving these units. As illustrated in FIG. 4, the fusion splicer 10 is constituted to include a computer serving as a control unit thereof and having hardware such as a CPU 10a, a RAM 10b, a ROM 10c, an input device 10d, a wireless communication module 10e, an auxiliary memory device 10f, and an output device 10g. When these constituent elements are operated by a program or the like, each of the functions (which will be described below) of the fusion splicer 10 is achieved. The fusion splicer 10 includes various kinds of fusion splicing mechanisms 10h in addition to the control unit.

The wireless communication unit 11 is a part performing wireless communication with respect to the information terminal 20 (wireless communication unit 21). For example, the wireless communication unit 11 is constituted of a wireless LAN card and performs wireless communication at a band of 2.4 GHz conforming to IEEE 802.11 with respect to the information terminal 20.

Figure 11:
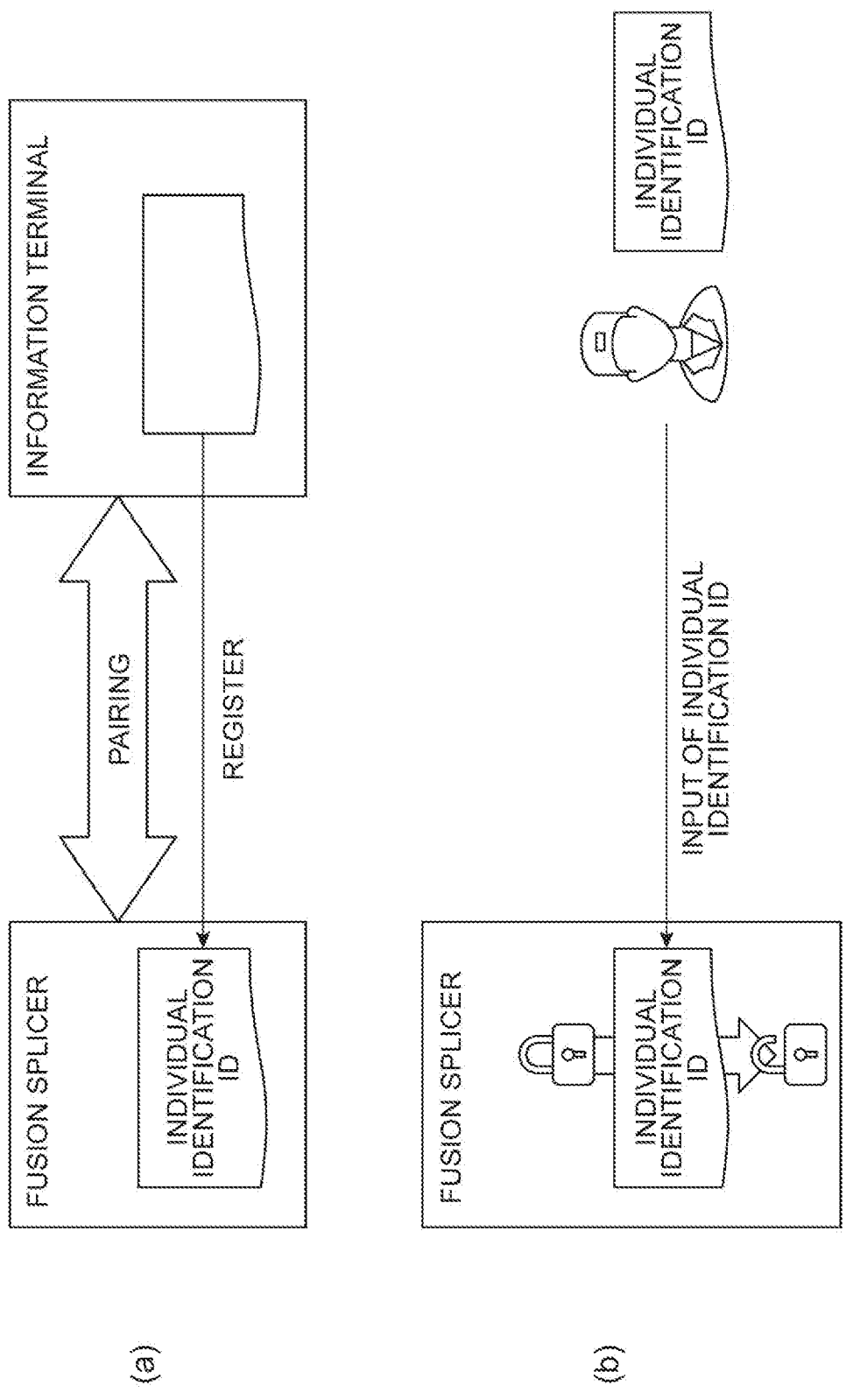
FIG. 11 A part (a) and a part (b) of FIG. 11 are views for describing a temporary unlocking technique performed when functions of the fusion splicer are locked due to malfunction or the like of the device.

The authentication processing unit 12 is a part performing authentication work such as pairing processing with respect to the information terminal 20 (authentication processing unit 22) via the wireless communication units 11 and 21. The authentication processing unit 12 extracts pairing information from a signal which is transmitted from the information terminal 20 as a message signal (for example, a text (TXT) file) including the pairing information and is received by the wireless communication unit 11. For example, the authentication processing unit 12 acquires four-digit number information which becomes the pairing information. The authentication processing unit 12 delivers this acquired four-digit number information to the display unit 13, causes the monitor to display the number for a predetermined time, and causes the display unit 13 to display a selection screen of "perform or do not perform pairing" with respect to the information terminal 20. When selection information indicating "perform pairing" with respect to the information terminal 20 is received from the display unit 13 (which will be described below), the authentication processing unit 12 generates a message signal indicating the fact and transmits the generated signal to the information terminal 20 (wireless communication unit 21 and authentication processing unit 22) via the wireless communication unit 11. During pairing processing, the authentication processing unit 12 acquires an identification ID (for example, a phone number, a mail address, or the like of the information terminal 20) identifying the individual information terminal 20 and delivers the identification ID to the storage unit 17 as identification information of the information terminal 20 (refer to the part (a) of FIG. 11). The storage unit 17 stores the identification information.

For example, the display unit 13 is constituted to include the monitor 5 described above and displays the selection screen showing a four-digit number required during pairing processing with respect to the information terminal 20, "perform or do not perform pairing" with respect to the information terminal 20 based on instruction information from the authentication processing unit 12. The display unit 13 causes the monitor 5 to display the four-digit number based on the four-digit number of the pairing information acquired by the authentication processing unit 12 and displays the selection screen of "perform or do not perform pairing" with respect to the information terminal 20. When "perform pairing" with respect to the information terminal 20 is selected, the display unit 13 delivers information indicating the selection to the authentication processing unit 12.

After pairing processing (authentication) with respect to the information terminal 20 is completed, the response processing unit 14 makes a predetermined response, for example, a reply of one dispatch confirmation signal for one received message regarding a message signal (condition confirmation information) sent from the information terminal 20 in a predetermined cycle, to the information terminal 20 at a lower protocol level via the wireless communication unit 11. The information terminal 20 can calculate the response time for a wireless signal (which will be described below) upon reception of the dispatch confirmation signal (refer to FIG. 6).

The decision unit 15 is a part secondarily deciding whether or not the fusion splicer 10 is in a stolen state based on communication conditions of wireless communication with respect to the information terminal 20. Main decision of a stolen state is executed by the decision unit 25 of the information terminal 20 described above. The decision unit 15 confirms the presence of a message signal or a pairing number in a file wirelessly transmitted from the information terminal 20 in a predetermined cycle after pairing processing, and performs processing of deleting the received message signals when it can be confirmed that a message signal is being sent in each predetermined cycle or when the pairing numbers coincide with each other. On the other hand, the decision unit 15 decides that the fusion splicer 10 is in a stolen state when no message signal is present (has not been transmitted) or the pairing numbers do not match each other during confirmation processing in a predetermined cycle. The expression "deciding whether or not being in a stolen state" stated herein denotes deciding whether or not being in a state which may occur when stolen (for example, a state where the fusion splicer 10 is away from an original position such that wireless communication cannot be performed) instead of directly deciding whether being actually stolen. When absence of a message signal or mismatch of the pairing number continuously occurs a stipulated number of times (for example, three times), the decision unit 15 may decide that the fusion splicer 10 is in a stolen state. Consequently, it is possible to determine that the fusion splicer 10 is a stolen state with higher accuracy.

The locking unit 16 is a part locking and disabling all or a part of the functions of the fusion splicer 10 when the decision unit 15 decides that the fusion splicer 10 is in a stolen state. When it is decided that the fusion splicer 10 is in a stolen state, the locking unit 16 electronically locks and disables all or a part of fusion splicing functions (fusion splicing mechanism 10h performing fusion between fibers through arc discharging, heating the fiber reinforcing sleeve, or the like) of the fusion splicer 10. When the locking processing is performed, the locking unit 16 may also perform automatic notification processing to the police, issue an antitheft buzzer notification, or the like in parallel.

The storage unit 17 is a part storing the identification ID (identification information) of the information terminal 20 subjected to authentication processing by the authentication processing unit 12. When the releasing unit 18 (which will be described below) refers to for the identification ID of the information terminal 20, the storage unit 17 delivers the stored identification ID of the information terminal 20 to the releasing unit 18. The storage unit 17 stores the stored identification ID of the information terminal 20 until a predetermined time period (for example, a week) elapses after wireless communication from the information terminal 20 is lastly confirmed, and the storage unit 17 deletes the data of the identification ID thereafter. The storage unit 17 may perform processing of disabling the identification ID after a predetermined time period has elapsed, instead of deleting the stored identification ID of the information terminal 20 after a predetermined time period has elapsed. In this case, disabled identification IDs can be restored by a hidden recovery technique set in advance.

The releasing unit 18 is a part temporarily releasing the functions of the fusion splicer 10 locked by the locking unit 16. The releasing unit 18 is a part temporarily releasing the locked state when wireless transmission and reception are lost due to malfunction of the information terminal 20 or the like so that the functions of the fusion splicer 10 is locked by the locking unit 16, and when a user desires to temporarily use the fusion splicer 10. When an input of unlocking from a user is received via the input unit 19, the releasing unit 18 first causes the display unit 13 to display an input screen for a release ID. Then, the releasing unit 18 decides whether or not the release ID input from a user matches the identification ID of the information terminal 20 stored in the storage unit 17. When the release ID and the identification ID match each other, the functions of the fusion splicer 10 locked by the locking unit 16 are temporarily released (refer to the part (b) of FIG. 11). The temporary release period is one to several days, for example. When the predetermined time period described above elapses after the releasing unit 18 has temporarily released the functions locked by the locking unit 16, the locking unit 16 performs processing of canceling unlocking by the releasing unit 18 such that the functions are in a locked state again. It is preferable that the releasing unit 18 uses the identification ID of the information terminal 20 as the identification information for checking for the release ID. In place thereof, the releasing unit 18 may check for the release ID using the pairing information as the identification information of the information terminal 20 or may use a different ID generated based on the identification ID.

The power source unit (battery) is accommodated inside a casing of the fusion splicer 10. It is preferable that electricity be supplied from this power source unit to the theft sensing system 1 at all times. Accordingly, the theft sensing system can be operated at all times without being affected by the usage state of the fusion splicer 10 (fusion splicing function). The power source unit may be shared with a unit for driving a fusion splicing mechanism. As long as safety is a priority, the power source unit may be separate from a power source unit for driving the fusion splicing mechanism and the power source unit for a theft sensing system may be accommodated at a place where a user cannot easily take out the power source unit.

Figure 8:
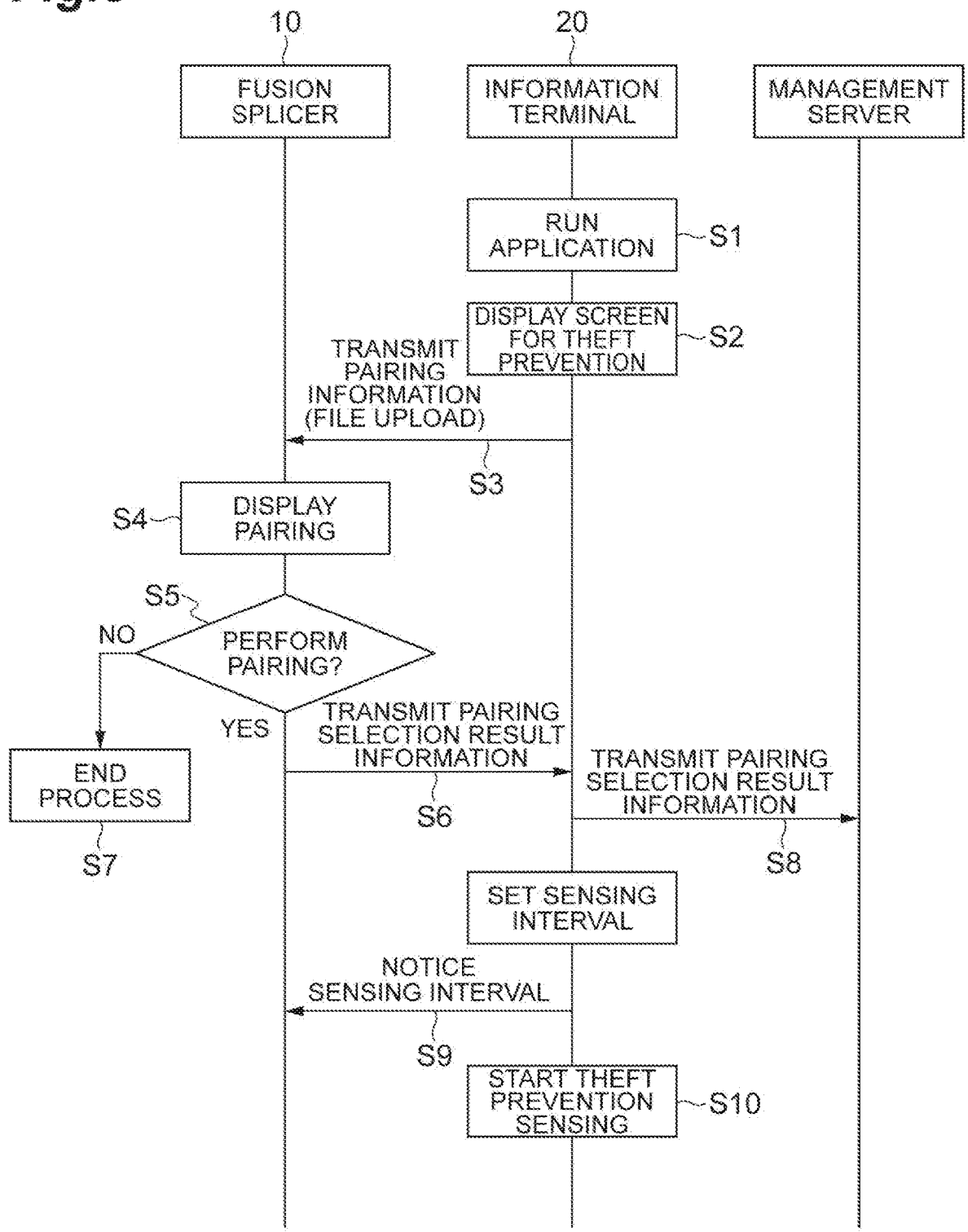
FIG. 8 is a sequence diagram showing pairing processing in the theft sensing system illustrated in FIG. 3.

Next, pairing processing (authentication processing) in the theft sensing system 1 according to the present embodiment will be described with reference to FIG. 8. FIG. 8 is a sequence diagram for performing pairing processing between the fusion splicer 10 and the information terminal 20 in the theft sensing system 1.

As illustrated in FIG. 8, in the theft sensing system 1, application for the theft sensing system is first run on the information terminal 20 by a user (Step S1). When this application is run, a screen for a theft prevention system is displayed in the information terminal 20, and a four-digit number for pairing is displayed in the screen for a predetermined time (for example, 10 seconds as a pairing standby time) by the display unit 23 (Step S2). The information terminal 20 uploads or transmits a message signal (for example, a TXT file) including pairing information for mutual authentication to the fusion splicer 10 using the wireless communication unit 21 substantially at the same time as the screen is displayed in Step S2 (Step S3). This message signal is not limited to a text file, and other forms may be adopted.

Next, in the fusion splicer 10 in which the message signal including pairing information is received by the wireless communication unit 11, the authentication processing unit 12 extracts four-digit numerical information for pairing included in the message signal, and the monitor displays the four-digit number. The fusion splicer 10 causes the monitor to display a selection screen such as "perform or do not perform pairing" with respect to the information terminal 20 using the authentication processing unit 12. Then, a user (the same user as the information terminal 20) of the fusion splicer 10 selects a selection item of either "perform or do not perform pairing" (Step S5). When selection indicating "performing pairing" is received by the authentication processing unit 12, the fusion splicer 10 generates a message signal (pairing selection result information) indicating "performing pairing", and transmits or uploads the generated signal to the information terminal 20 via the wireless communication unit 11 (Step S6). When selection indicating "do not performing pairing" is received, the fusion splicer 10 ends the processing using the authentication processing unit 12 (Step S7).

Next, the information terminal 20 which has received the information (the pairing selection result information) indicating "performing pairing" sets a predetermined cycle for sensing such as theft sensing, the radiowave intensity, and/or the response time using the acquisition unit 24. For example, the information terminal 20 causes the display unit 23 to display an interval (for example, every minute, every ten minutes, every hour, or every day) for sensing the presence or absence of theft in the theft sensing system 1, and/or a total time (for ten minutes, for an hour, for a day, for thirty days, or the like) of sensing the presence or absence of theft in the display as a selection screen, and sets the desired interval and/or the desired total time selected by a worker using the acquisition unit 24. The information terminal 20 transmits the information (the pairing setting information) such as the desired interval and/or the desired total time to the paired fusion splicer 10 (Step S9). The information terminal 20 may transmit the pairing information (the pairing selection result information) received from the fusion splicer 10 to the management server collectively controlling the entire system (Step S8). Regarding Step S8, the information (the pairing selection result information and the pairing setting information) may be transmitted to the management server after the sensing interval, the total time, and/or the like are set. Through the foregoing processing, the theft sensing system 1 starts sensing theft (Step S10).

Figure 9:
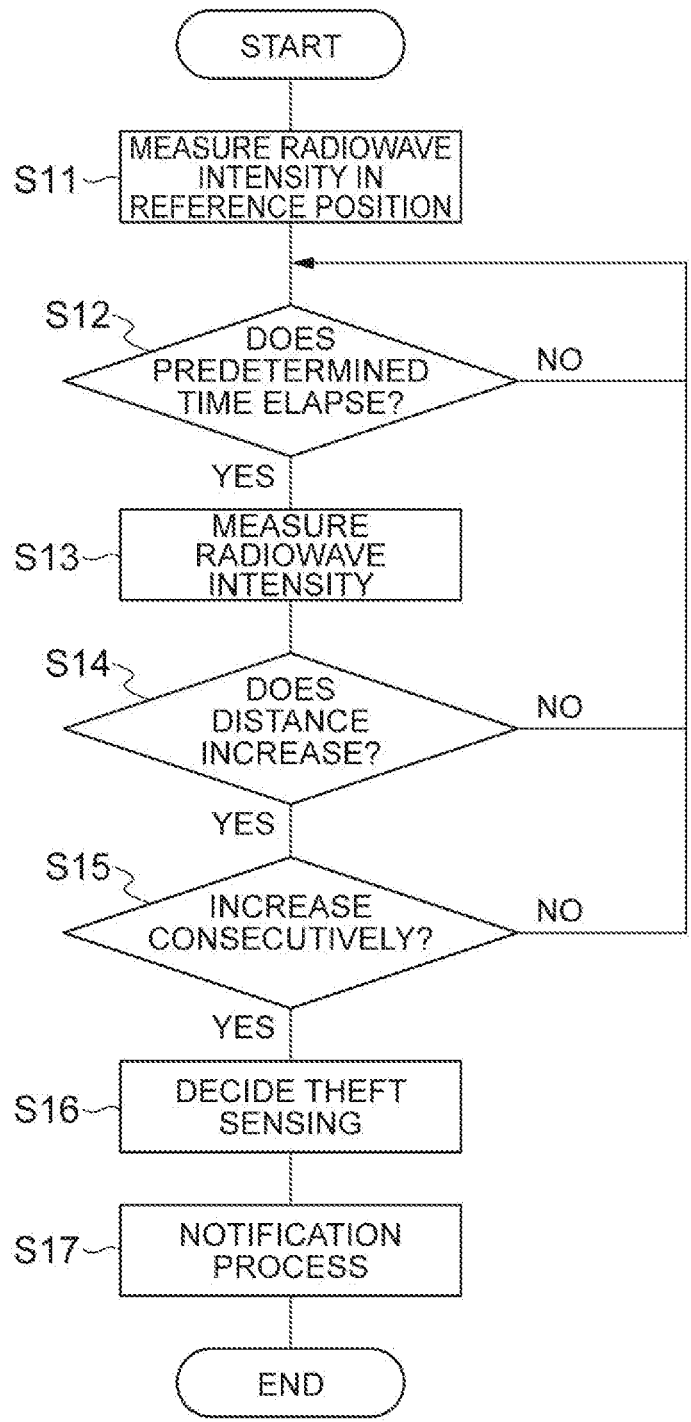
FIG. 9 is a flowchart showing a method for sensing theft of the fusion splicer using the theft sensing system illustrated in FIG. 3.

Next, with reference to FIG. 9, a method for sensing theft of the paired fusion splicer 10 using the information terminal 20 will be described. FIG. 9 is a flowchart showing the method for sensing theft in the theft sensing system 1.

As illustrated in FIG. 9, the fusion splicer 10 and the information terminal 20 subjected to pairing processing are disposed within 1 m, and the radiowave intensity between the fusion splicer 10 and the information terminal 20 at this time (at a reference position) is measured using the acquisition unit 24 (Step S11). In the present embodiment, for example, it is assumed that the radiowave intensity at this time is −40 dBm.

Subsequently, the information terminal 20 judges whether or not a predetermined time (for example, an hour) has elapsed after theft sensing processing has started, using the acquisition unit 24 (Step S12). When the predetermined time has elapsed as a result of judging whether the predetermined time has elapsed in Step S12, the information terminal 20 measures the radiowave intensity between the fusion splicer 10 and the information terminal 20 again using the acquisition unit 24 (Step S13). The decision unit 25 of the information terminal 20 checks the distance table 29 shown in FIG. 6 with the measured radiowave intensity and calculates the distance between the fusion splicer 10 and the information terminal 20 (Step S14). When this distance is larger than a distance based on the radiowave intensity measured prior thereto, the process proceeds to Step S15.

In the information terminal 20, in deciding in Step S14, when deciding that the distance between the fusion splicer 10 and the information terminal 20 checked and calculated based on the measured radiowave intensity and the distance table 29 is larger than a distance based on the radiowave intensity measured prior thereto occurs a predetermined number of times (for example, continues three times) (Step S15), the decision unit 25 senses that the fusion splicer 10 has moved in a direction away from the information terminal 20, that is, the fusion splicer 10 is in a stolen state (Step S16). When it is sensed that the fusion splicer 10 is in a stolen state, notification processing is performed using a buzzer or the like in the information terminal 20, and the fact is notified to a user (Step S17). The user can be informed that the fusion splicer 10 is the stolen state through the notification. In a case of such a stolen state, in which the information can be transmitted to the fusion splicer 10 (in a case where wireless communication is not disconnected yet), a signal indicating that the fusion splicer 10 is moving in a direction away from the information terminal 20 may be transmitted to the fusion splicer 10, such that operation of the fusion splicing mechanism 10h is locked by the locking unit 16 in the fusion splicer 10. In the example described above, the method for deciding theft sensing has been described with an example of the radiowave intensity. The same applies to the case of sensing theft using the response time shown in FIG. 6.

Figure 10:
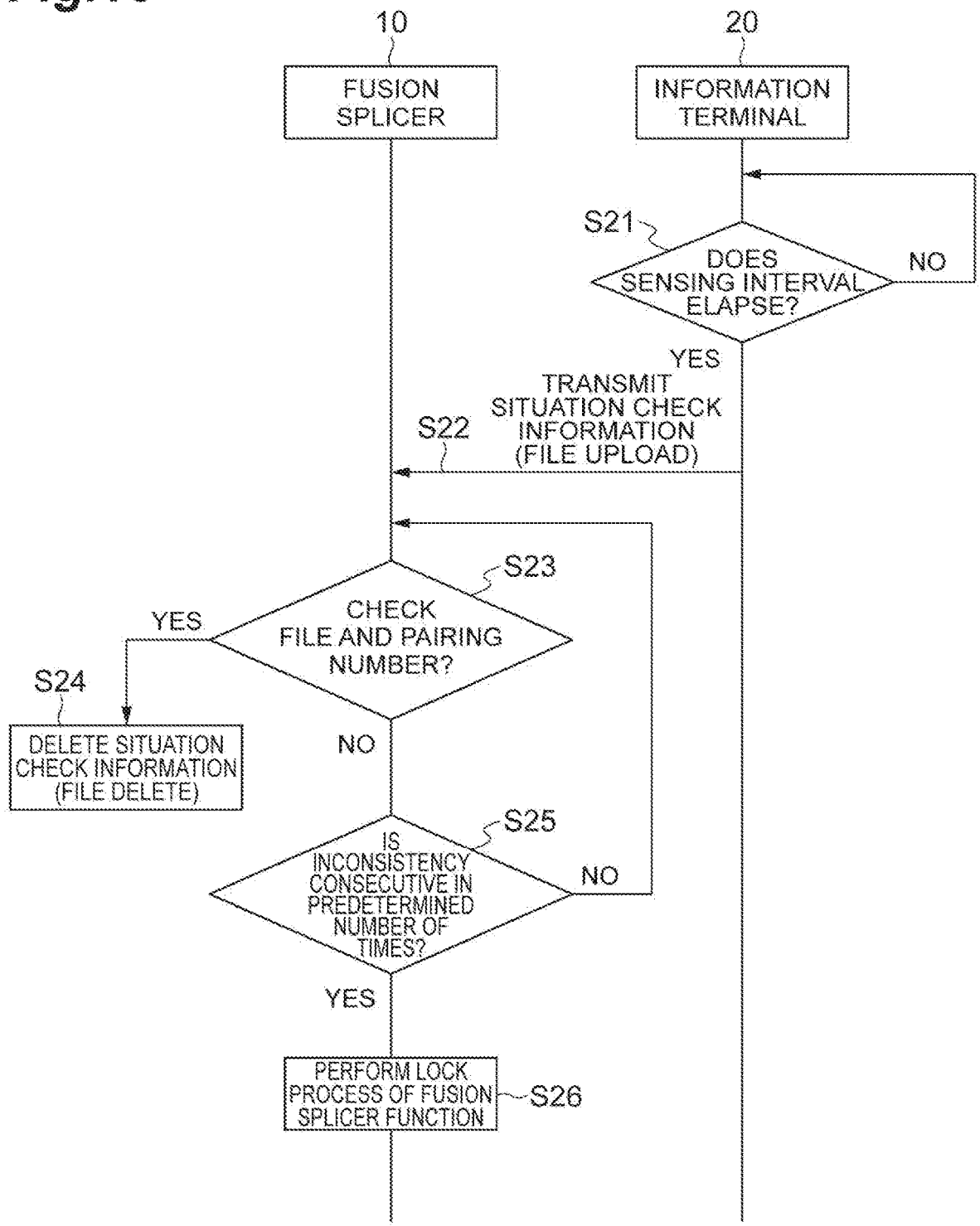
FIG. 10 is a sequence diagram showing processing of locking the fusion splicer in the theft sensing system illustrated in FIG. 3.

Next, with reference to FIG. 10, locking processing of the fusion splicing mechanism in the fusion splicer 10 will be described. A part or all of the sequences shown in FIG. 10 are practically duplicate processing as the flow of sensing theft shown in FIG. 9. However, they may be separately performed.

First, in the information terminal 20, when a predetermined sensing interval has elapsed (Step S21), a message signal (condition confirmation information) (for example, a TXT file) indicating whether the fusion splicer 10 is stolen is transmitted (uploaded) to the fusion splicer 10 (Step S22). This signal includes pairing information including a pairing number. This message signal is not limited to a text file.

Subsequently, the pairing number is extracted from the signal in the fusion splicer 10 which has received the signal, and the locking unit 16 confirms the pairing number in the file (Step S23). Then, when the pairing number matches the number stored in the fusion splicer 10 in advance, the locking unit 16 deletes the received message signal (condition confirmation information) (Step S24). When the pairing number does not match the number in Step S24, the process returns to Step S23. The fusion splicer 10 performs this confirmation procedure in a predetermined cycle set in advance, and confirms whether mismatching of the pairing number or failure of receiving (failure of confirming) a message signal from the information terminal 20 continues a predetermined number of times (Step S25).

Subsequently, when it is judged in deciding in Step S25 that mismatching of the pairing number or failure of receiving (failure of confirming) a message signal from the information terminal 20 continues a predetermined number of times in the fusion splicer 10, the decision unit 15 judges that the fusion splicer 10 is in a stolen state, and the process proceeds to Step S26. Then, the locking unit 16 locks the fusion functions of the fusion splicer 10 (Step S26). Consequently, when the fusion splicer 10 is stolen, it can be made unusable.

Incidentally, it is conceivable that the wireless communication unit 11 of the fusion splicer 10 or the wireless communication unit 21 of the information terminal 20 has malfunctioned while being in use so that transmitting and receiving the wireless signal described above and theft sensing processing cannot be appropriately executed and it is determined as a stolen state although it is not actually stolen, and therefore the fusion functions of the fusion splicer 10 are locked by the locking unit 16 as illustrated in Step S26. Here, the fusion splicer 10 may be provided with a constitution in which the locked state can be temporarily released in such a case.

Figure 12:
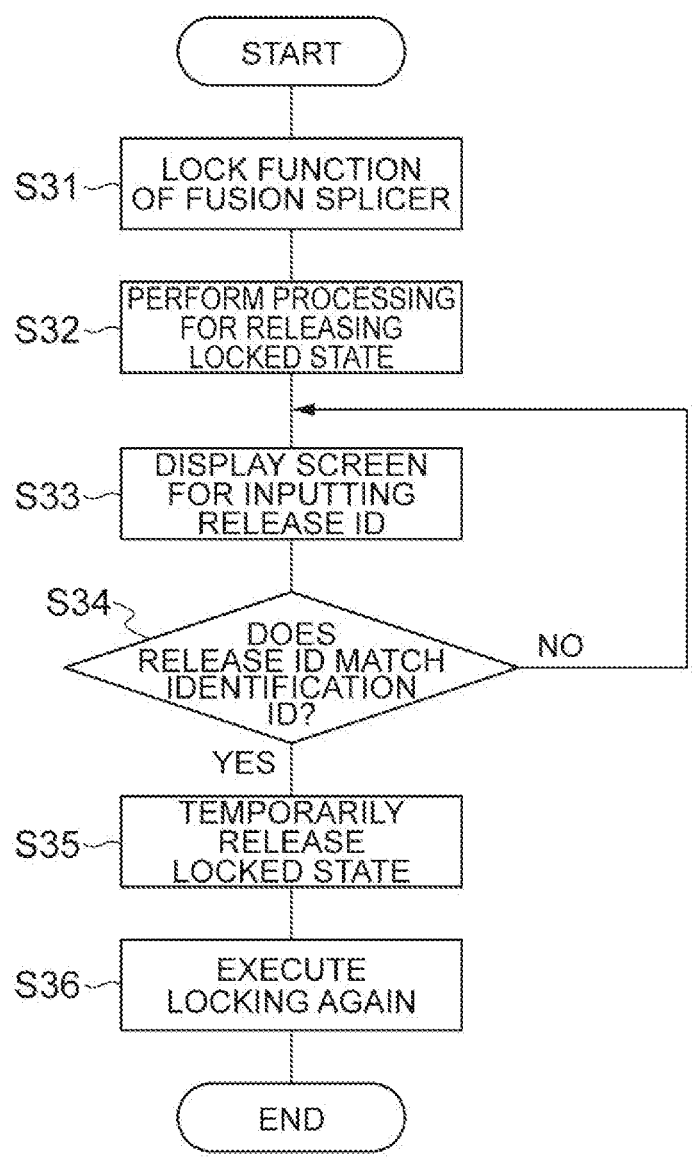
FIG. 12 is a flowchart showing a temporary releasing method performed when the functions of the fusion splicer are locked.

Specifically, as illustrated in FIG. 12, when the fusion splicing functions of the fusion splicer 10 are locked due to malfunction or the like of the wireless device of the information terminal 20 (Step S31), a user starts release processing for performing temporary unlocking with respect to the input unit 19 (Step S32).

Subsequently, when release processing for performing temporary unlocking is input to the input unit 19, the fusion splicer 10 displays a screen for inputting the release ID in order to urge a user to input the release ID for performing unlocking (Step S33).

Subsequently, when the release ID is input, the releasing unit 18 reads the identification ID of the information terminal 20 stored in the storage unit 17 and checks whether or not the input release ID matches the identification ID of the information terminal 20 (Step S34). When the input release ID matches the identification ID, the releasing unit 18 releases the locked functions of the fusion splicer 10 locked by the locking unit 16 and executes processing to make it usable (Step S35). In such a manner described above, a user can temporarily use the fusion splicer 10. Since the releasing is temporarily performed, all the functions released by the releasing unit 18 are locked again by the locking unit 16 after a predetermined time period (day to several days) has elapsed (Step S36). Since there is a period for temporary unlocking, a user can call a support center or the like and can restore the information terminal. Therefore, work due to the fusion splicer 10 can continue without interruption.

According to the theft sensing system 1 of the present invention, the fusion splicer 10 moving in a direction away from the position is sensed based on the position of the information terminal 20 which a user can carry at all times, so that a user can be easily informed of the fact. Thus, theft of the fusion splicer 10 can be prevented.

The theft sensing system 1 includes the distance table 29 in which the relationship between the wireless condition data between the fusion splicer 10 and the information terminal 20 and the distance between the fusion splicer 10 and the information terminal 20 is set in advance. The decision unit 25 checks the distance table 29 with the wireless condition data acquired by the acquisition unit 24 and calculates the distance between the fusion splicer 10 and the information terminal 20. When the calculated distance is larger than a distance calculated prior thereto, it is decided that the fusion splicer 10 has moved in a direction away from the information terminal 20. According to the theft sensing system 1, since movement of the fusion splicer 10 is determined using the distance table 29 set in advance, deciding processing can be simplified.

In the theft sensing system 1, the acquisition unit 24 acquires the wireless condition data including the radiowave intensity and/or the response time of wireless communication between the fusion splicer 10 and the information terminal 20. In this manner, according to the theft sensing system 1, unauthorized movement of the fusion splicer 10 is judged utilizing information which is related to a wireless device and is often provided for adding other functions (for example, general data management of the fusion splicer).

Thus, the fusion splicer 10 can be provided with a new function such as theft prevention without adding any new component or with less components added thereto.

In the theft sensing system 1, the acquisition unit 24 continuously acquires the wireless condition data in a predetermined cycle. Since the wireless condition data is continuously acquired in a predetermined cycle, it is possible to continuously sense that the fusion splicer 10 is moving away from the information terminal 20, and theft of the fusion splicer 10 can be determined more reliably while movement of the fusion splicer 10 other than theft is excluded from the deciding, so that theft can be further prevented.

The theft sensing system 1 further includes the locking unit 16 locking the functions of the fusion splicer in the fusion splicer 10 when the decision unit 25 decides that the fusion splicer 10 has moved in a direction away from the information terminal 20 or decides that wireless communication between the fusion splicer 10 and the information terminal 20 is disconnected. According to such a theft sensing system 1, even if it is stolen, locking (disable processing) is performed from the information terminal 20. Thus, even if only the fusion splicer 10 is stolen, it is difficult to unlock the device, so that theft of the fusion splicer 10 can be further prevented. In this case, this theft sensing system 1 may further include the releasing unit 27 which releases functions locked by the locking unit 16. When such a release means is provided, even in a case where the fusion splicer 10 is locked, the locked state can be released through an appropriate recovery procedure performed by an authorized user, and thus the fusion splicer 10 can be used again. Such a releasing unit may be provided on the server acquiring the authentication information by the authentication processing unit 22, or the server may transmit a signal for releasing the functions locked by the locking unit 16 using the authentication information to the fusion splicer 10. In this case as well, similar effects can be exhibited.

The theft sensing system 1 further includes the position acquisition unit 28 acquiring positional information of the fusion splicer 10. Due to this constitution, even if the fusion splicer 10 is stolen, the positional information related to the theft position required for a theft report or a theft insurance can be stored in the information terminal 20. Even if the fusion splicer 10 is stolen, it is possible simplify various kinds of processing to be performed thereafter. Regarding the positional information, it may be acquired when the decision unit 25 decides that the fusion splicer 10 has moved in a direction away from the information terminal 20 or decides that wireless communication between the fusion splicer 10 and the information terminal 20 is disconnected. Alternatively, the positional information may be regularly acquired, saved, and updated at a predetermined time interval, and the latest positional information acquired when it is decided as described may be saved.

In the fusion splicer 10, the storage unit 17 stores the identification ID of the information terminal 20 subjected to authentication processing, and the releasing unit 18 temporarily releases the device functions locked by the locking unit 16 when the release ID input from the input unit 19 matches this identification ID. Thus, according to the fusion splicer 10, in addition to preventing theft of the fusion splicer 10 due to deciding by the decision unit 15 and locking of the functions by the locking unit 16, temporary releasing of the locked functions caused by theft sensing can be easily realized by the releasing unit 18. As a result, when the communication conditions deteriorate due to malfunction of the information terminal 20, a problem of communication (wireless communication or the like) with respect to the information terminal 20, or the like, such that it is erroneously decided that the fusion splicer 10 is a stolen state and the device functions are locked, the locked state can be temporarily released using the identification ID. Thus, interruption of work due to the fusion splicer 10 is avoided, so that work can be continuously performed. Furthermore, since the unlocking described above is temporarily performed, the influence on the function preventing theft of the fusion splicer 10 can be reduced.

In the fusion splicer 10, the decision unit 15 decides that the fusion splicer 10 is in a stolen state when wireless communication from the information terminal 20 cannot be received for a predetermined time period. When the wireless communication unit 11 or 21 of the information terminal 20 or the fusion splicer 10 has malfunctioned or the like, wireless communication between the information terminal 20 and the fusion splicer 10 is completely lost. Since the decision unit 15 decides that the fusion splicer 10 is in a stolen state when wireless communication from the information terminal 20 cannot received for a predetermined time period, the condition of the malfunction can be sensed more reliably.

In the fusion splicer 10, the storage unit 17 executes processing of deleting or disabling the stored identification information of the information terminal 20 after elapse of a predetermined time period. Releasing of the locked functions of the fusion splicer 10 can be temporarily performed more reliably by executing this processing, and therefore theft of the fusion splicer 10 can be prevented more reliably.

In the fusion splicer 10, the locking unit 16 locks the functions of the fusion splicer 10 again after the locked state is temporarily released by the releasing unit 18. Consequently, theft of the fusion splicer 10 can be prevented more reliably.

In the fusion splicer 10, the identification information of the information terminal 20 is acquired during authentication of the information terminal 20 performed by the authentication processing unit 12, and the identification information is stored in the storage unit 17. Thus, the identification information of the information terminal 20 can be acquired more reliably.

Hereinabove, the theft sensing system and the fusion splicer according to the present embodiment have been described. However, the present invention is not limited thereto, and various modifications can be applied.

REFERENCE SIGNS LIST

1 Theft sensing system
10 Fusion splicer
11, 21 Wireless communication unit
12, 22 Authentication processing unit
13, 23 Display unit
14 Response processing unit
15 Decision unit
16 Locking unit
17 Storage unit
18 Releasing unit
19 Input unit
20 Information terminal
24 Acquisition unit
25 Decision unit
26 Notification unit
27 Releasing unit
28 Position acquisition unit
29 Distance table

The invention claimed is:

1. A fusion splicer configured to sense whether or not the fusion splicer is in a stolen state in cooperation with an external theft sensing device, the fusion splicer comprising:
an authentication processing unit that authenticates the theft sensing device to connect the fusion splicer and the theft sensing device to each other through a predetermined communication technique;
a storage unit that stores identification information of the theft sensing device subjected to authentication processing by the authentication processing unit;
a decision unit that decides whether or not the fusion splicer is in a stolen state based on a communication condition of the predetermined communication technique with respect to the theft sensing device;
a locking unit that locks at least a part of functions of the fusion splicer when the decision unit decides that the fusion splicer is in a stolen state;
a releasing unit that temporarily releases the function of the fusion splicer locked by the locking unit; and
an input unit that receives an input of a release ID for unlocking by the releasing unit,
wherein the releasing unit temporarily releases the locked state when the release ID input from the input unit corresponds to the identification information stored in the storage unit, and
wherein the locking unit locks the function of the fusion splicer again by performing processing of canceling unlocking by the releasing unit when a predetermined time period elapses after the locked state is temporarily released by the releasing unit.

2. The fusion splicer according to claim 1, wherein the decision unit decides that the fusion splicer is in a stolen state when wireless communication from the theft sensing device through the predetermined communication technique is not able to be received for a predetermined time period.

3. The fusion splicer according to claim 1, wherein the storage unit executes processing of deleting or disabling the stored identification information of the theft sensing device after elapse of a predetermined time period.

4. The fusion splicer according to claim 1, wherein the identification information of the theft sensing device is acquired during authentication of the theft sensing device by the authentication processing unit and is stored in the storage unit.

5. The fusion splicer according to claim 1, wherein the releasing unit temporarily releases the function of the fusion splicer by checking whether release identification information input to the fusion splicer corresponds to the identification information of the theft sensing device stored in the storage unit.

6. The fusion splicer according to claim 1, wherein the predetermined time period is equal to or more than one day.

7. The fusion splicer according to claim 6, wherein the predetermined time period is less than several days.

8. A theft sensing system for sensing a stolen state of a fusion splicer using a theft sensing device, the theft sensing system comprising:
an authentication processing unit that authenticates the fusion splicer to connect the fusion splicer and the theft sensing device to each other through a predetermined communication technique;
an acquisition unit that acquires wireless condition data regarding wireless connection with respect to the fusion splicer by the authentication processing unit;

a decision unit that decides whether or not the fusion splicer is in a stolen state based on a change in the wireless condition data acquired by the acquisition unit;

a notification unit that issues a notification when the decision unit decides that the fusion splicer is in a stolen state; and a releasing unit that makes the fusion splicer temporarily release a locked state thereof when it is decided that the fusion splicer is in a stolen state and a fusion mechanism of the fusion splicer is locked, wherein the function mechanism of the fusion splicer is locked again after the locked state is temporarily released by the releasing unit.

9. The theft sensing system according to claim 8, further comprising:

a distance table that stores relationship data of at least one of a radiowave intensity and a response time between the fusion splicer and the theft sensing device and a distance between the fusion splicer and the theft sensing device, wherein the decision unit calculates the distance between the fusion splicer and the theft sensing device based on at least one of the radiowave intensity and the response time stored in the distance table and decides whether or not the fusion splicer is in a stolen state based on a change in the distance.

10. The theft sensing system according to claim 9, wherein the acquisition unit acquires data which is the wireless condition data of at least one of the radiowave intensity and the response time between the fusion splicer and the theft sensing device in a predetermined cycle, and wherein the decision unit calculates the distance between the fusion splicer and the theft sensing device every time the wireless condition data is acquired and decides that the fusion splicer is in a stolen state when a state where the distance becomes longer than a distance acquired prior thereto continues.

11. The theft sensing system according to claim 8, further comprising:

a position acquisition unit that acquires positional information of the fusion splicer when it is decided that the fusion splicer is in a stolen state.

12. The theft sensing system according to claim 8, wherein the releasing unit generates a release signal including authentication information retained by the authentication processing unit and sends the release signal to the fusion splicer so as to make the fusion splicer temporarily release the locked state.

13. A method for sensing theft of a fusion splicer using a theft sensing device, the theft sensing method comprising:

performing mutual authentication between the fusion splicer and the theft sensing device such that the fusion splicer and the theft sensing device are wirelessly connected to each other;

acquiring a reference value of wireless condition data between the fusion splicer and the theft sensing device which are wirelessly connected to each other;

acquiring the wireless condition data between the fusion splicer and the theft sensing device which are wirelessly connected to each other in a predetermined cycle after the reference value of the wireless condition data is acquired;

deciding whether or not the fusion splicer is stolen based on the wireless condition data acquired in the predetermined cycle;

locking at least a part of functions of the fusion splicer when it is decided that the fusion splicer is in a stolen state;

temporarily releasing the function of the fusion splicer locked in the locking; and locking the function of the fusion splicer again by performing processing of canceling unlocking in the releasing when a predetermined time period elapses after the locked state is temporarily released in the releasing.

14. The theft sensing method according to claim 13, wherein in the deciding theft, a distance between the fusion splicer and the theft sensing device is calculated based on at least one of a radiowave intensity and a response time stored in a distance table with reference to the distance table storing relationship data of at least one of the radiowave intensity and the response time between the fusion splicer and the theft sensing device and the distance between the fusion splicer and the theft sensing device, and it is decided whether or not the fusion splicer is in a stolen state based on a change in the distance.

15. The theft sensing method according to claim 14, wherein in the acquiring the wireless condition data in the predetermined cycle, data which is the wireless condition data of at least one of the radiowave intensity and the response time between the fusion splicer and the theft sensing device, is acquired in the predetermined cycle, and wherein in the deciding theft, the distance between the fusion splicer and the theft sensing device is calculated every time the wireless condition data is acquired, and it is decided that the fusion splicer is in a stolen state when a state where the distance becomes longer than a distance acquired prior thereto continues.

16. The theft sensing method according to claim 13, wherein in the acquiring the reference value of the wireless condition data, at least one of the radiowave intensity and the response time between the fusion splicer and the theft sensing device is acquired.

17. The theft sensing method according to claim 13, further comprising:

acquiring positional information of the fusion splicer when it is decided that the fusion splicer is in a stolen state.

18. The theft sensing method according to claim 13, wherein, in the releasing, the function of the fusion splicer is temporarily released by checking whether release identification information input to the fusion splicer corresponds to identification information of the theft sensing device.

* * * * *